United States Patent
Chen et al.

(10) Patent No.: US 8,930,446 B2
(45) Date of Patent: Jan. 6, 2015

(54) ALTERING TRANSCODING PRIORITY

(75) Inventors: Kuang M. Chen, San Diego, CA (US);
William P. Franks, San Diego, CA (US); Paul Moroney, La Jolla, CA (US)

(73) Assignee: Motorola Mobility LLC, Chicago, IL (US)

( * ) Notice: Subject to any disclaimer, the term of this patent is extended or adjusted under 35 U.S.C. 154(b) by 215 days.

(21) Appl. No.: 13/344,607

(22) Filed: Jan. 5, 2012

(65) Prior Publication Data
US 2012/0179745 A1 Jul. 12, 2012

Related U.S. Application Data

(60) Provisional application No. 61/430,149, filed on Jan. 5, 2011, provisional application No. 61/430,202, filed on Jan. 6, 2011.

(51) Int. Cl.
| | | |
|---|---|---|
| *G06F 15/16* | (2006.01) | |
| *H04L 29/06* | (2006.01) | |
| *H04N 21/6587* | (2011.01) | |
| *H04N 21/2343* | (2011.01) | |

(52) U.S. Cl.
CPC .......... *H04L 65/602* (2013.01); *H04N 21/6587* (2013.01); *H04L 63/0435* (2013.01); *H04N 21/234309* (2013.01); *H04L 63/0471* (2013.01)
USPC .......................................... 709/203; 709/231

(58) Field of Classification Search
CPC ........................... H04L 63/0435; H04L 65/602
USPC ................................................. 709/203, 231
See application file for complete search history.

(56) References Cited

U.S. PATENT DOCUMENTS

| | | | |
|---|---|---|---|
| 2004/0202322 A1 | 10/2004 | Chavanne et al. | |
| 2006/0184790 A1 | 8/2006 | Oliveira et al. | |
| 2007/0226365 A1* | 9/2007 | Hildreth et al. | 709/231 |
| 2011/0129087 A1 | 6/2011 | Zhang et al. | |
| 2012/0117587 A1* | 5/2012 | Pedlow et al. | 725/25 |

OTHER PUBLICATIONS

ISMA: "Internet Streaming Media Alliance 1-14 Encryption and Authentication Version 2.0", ISMA Internet Streaming Media Alliance, Nov. 2007, pp. 1-60, XP002636085, Retrieved from the Internet: URL:http://www.mpegif.org/m4if/bod/ISMA/IS_MA_E &Aspec2.0.pdf [retrieved on Jan. 1, 2008], all pages.

(Continued)

*Primary Examiner* — Yves Dalencourt
(74) *Attorney, Agent, or Firm* — Fish & Richardson P.C.

(57) ABSTRACT

In an embodiment, a content array represents media content available from a media server. The content array, sent by a media server in response to a request, lists content program objects that represent media content to be available from the media server. The media server receives a message for altering a transcoding priority of the selected content program object that represents media content not previously transcoded by the media server, and sends a return code for indicating whether the transcoding priority was successfully altered in response to the message. In a further embodiment, a media server system includes a transcoding queue with references to a plurality of content program objects that include an object method for altering a transcoding priority, and includes a transcoder configured to transcode media content associated with the content program objects according to the transcoding priority of each content program object of the transcoding queue.

18 Claims, 13 Drawing Sheets

(56) References Cited

OTHER PUBLICATIONS

Apple Computer ED—Joint Photographic Expert Group (JPEG): "15444-12 Amendment 1 Proposed FDAM Text", Joint Photographic Expert Group Conference, Crowborough : JPEG Forum Ltd, GB, Mar. 26, 2004, all pages.

Harald Fuchs et al: "Encrypted Content Format for Protected Music Player MAF", ITU Study Group 16—Video Coding Experts Group—ISO/IEC MPEG &ITU-T VCEG(ISO/IEC JTCI/SC29/WGII and ITU-T SG16 Q6), XX, XX, No. M12971, Jan. 11, 2006, XP030041640, all pages.

Fielding, R. et al.: "Hypertext Transfer Protocol—HTTP/1.1", Network Working Group, Request for Comments: 2616, Obsoletes: 2068, Jun. 1999, all pages.

\* cited by examiner

ALTERING TRANSCODING PRIORITY

RELATED APPLICATIONS

This application claims priority to U.S. Provisional Application Ser. No. 61/430,149 filed Jan. 5, 2011, entitled "Altering Transcoding Priority," the disclosure of which is incorporated by reference herein in its entirety. This application also claims priority to U.S. Provisional Application Ser. No. 61/430,202, filed Jan. 6, 2011, entitled "An Object Model for Domain-based Content Mobility Solution," the disclosure of which is incorporated by reference herein in its entirety.

This application has related subject matter to commonly assigned U.S. patent application Ser. No. 13/344,000, filed Jan. 5, 2012, entitled "Secure Progressive Download for Media Content Playback," the disclosure of which is incorporated by reference herein in its entirety.

BACKGROUND

The traditional notion of watching television at home has evolved into many different forms of viewing television content, on many different devices. For example, users can watch television content, such as live television, recorded television, and time-shifted programs and movies, on various devices, such as televisions, display devices, entertainment devices, computers, and even mobile devices, such as tablets and mobile phones. Media content that is streamed or otherwise communicated to a client device, such as media content wirelessly communicated to a mobile phone, needs to be maintained as secure and encrypted.

Digital media can be transcoded and then streamed, moved, or otherwise communicated to a client device where the video/audio playback takes place. Digital media transcoders can transform the encoding of media content from one format to another so that other devices can more readily consume or render the content; for example, many current mobile phones are not able to render high-definition media content. Transcoding often takes tens of minutes or even hours, depending upon the type and the length of the content. The latency can become increasingly lengthy, and therefore unpleasant to the end user, if there are multiple content items to be transcoded.

BRIEF DESCRIPTION OF THE DRAWINGS

Embodiments of altering transcoding priority for media content are described with reference to the following figures. The same numbers may be used throughout to reference like features and components that are shown in the figures.

DETAILED DESCRIPTION

In embodiments, altering transcoding priority for media content can be utilized as part of a system to deliver encrypted media content to a client device, such as a mobile phone, tablet device, or portable computer, for playback by a media player that controls playback of the media content on the client device. Secure media content can be downloaded from a remote media server, or from a network-based content server (e.g., in the cloud) to the client device. The client device implements a proxy application between the media player and a media server from which the media content is received. In embodiments, a television set-top box, such as a digital video recorder (DVR), receives and records media content. The DVR content can then be re-purposed to support two modes of playback operation at a mobile client device. The DVR content can be communicated to the media server that then downloads the media content to the mobile client device where it is stored on the mobile client device for local playback at any time, and from anywhere. Alternatively, the media server downloads the media content to the mobile client device for simultaneous playback on the mobile client device.

In an example system, the media server receives encrypted media content from a television client device, such as a DVR that records the media content. The media server receives and decrypts the encrypted media content via standard digital transmission content protection (DTCP). The media server then formats the decrypted media content for playback by the media player on the client device by transcoding the media content; e.g., by transrating or transsizing the media content, or by transcoding from high-definition media content to VGA formatted media content, or to an MPEG-2 format. The media server then re-encrypts the formatted media content for communication to the client device as encrypted, formatted media content.

While features and concepts of altering transcoding priority for media content can be implemented in any number of different devices, systems, networks, and/or configurations, embodiments of altering transcoding priority for media content are described in the context of the following example devices, systems, and methods.

Figure 1:
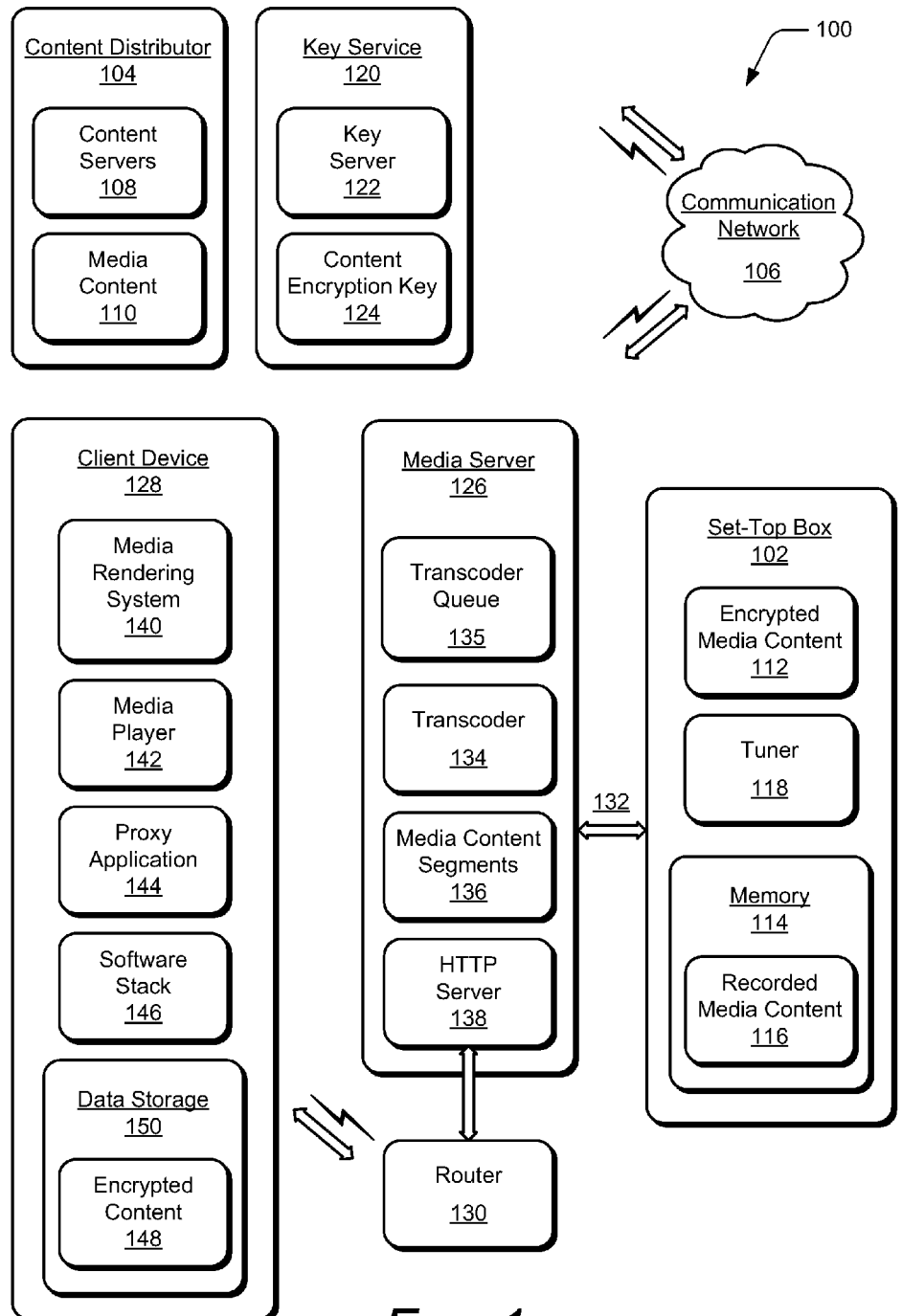
FIG. 1 illustrates an example system in which embodiments of altering transcoding priority for media content can be implemented.

FIG. 1 illustrates an example system 100 in which embodiments of altering transcoding priority for media content can be implemented. The example system 100 includes a television set-top box 102, such as cable television box, digital video recorder (DVR), or any other type of television client device that receives media content from a headend via a service network. For example, a content distributor 104 and/or other media content sources deliver media content and data to any number of various devices via a communication network 106, such as to the television set-top box in a home or business environment.

The content distributor 104 includes content servers 108 to distribute media content 110 to the set-top box 102, such as live television and/or recorded on-demand video content that is distributed via a coaxial cable system or IP-based system. The set-top box 102 receives the media content from the content distributor as encrypted media content 112, which can include any type of audio, video, and/or image data in the form of television programming, movies, on-demand video, interactive games, advertisements, and the like. In a DVR implementation, the set-top box can record the encrypted media content with memory 114 that maintains the recorded media content 116. In this example, the set-top box 102 also includes a tuner 118 that tunes to a television channel frequency over which the media content is delivered. In addition, the set-top box can be implemented with various components, such as processor and memory devices, as well as with any combination of differing components as further described with reference to the example electronic device shown in FIG. 5.

The example system also includes a key service 120, such as any key encryption service and/or key service provider, that implements a key server 122 to distribute a content encryption key 124 (CEK) for secure delivery and communication of encrypted media content. In implementations, the encrypted media content is not dependent on a particular key server, and different key servers or services may be utilized for the secure delivery and communication of media content between devices, services, and/or components in the example system 100. The content distributor, key service, and/or the respective servers can be implemented with various components, such as processor and memory devices, as well as with any combination of differing components as further described with reference to the example electronic device shown in FIG. 5. For example, the content distributor and the key service include storage media, such as any type of memory and/or suitable electronic data storage, to store or otherwise maintain the media content and other data.

Any of the services, devices, and servers can communicate via the communication network 106, which can be implemented to include a wired and/or a wireless network. The communication network can also be implemented using any type of network topology and/or communication protocol, and can be represented or otherwise implemented as a combination of two or more networks, to include IP-based networks and/or the Internet. The communication network may also include mobile operator networks that are managed by a mobile network operator and/or other network operators, such as a communication service provider, cell-phone provider, and/or Internet service provider.

The example system 100 also includes a media server 126 that is implemented to communicate media content, such as recorded media content, to a client device 128 via a router 130 implemented for wired and/or wireless communication. The media server 126 receives the encrypted media content 112 and/or the recorded media content 116 from the set-top box 102 via an Ethernet connection 132. The media server is implemented to communicate and sync with the set-top box (and/or DVR) automatically, and provides a proprietary interface for media content look-up, transport, and protection. The media server decrypts the encrypted media content that is received from the set-top box via DTCP, and then, if desired, transcodes the decrypted media content. The media server can also communicate with the key service 120 via the communication network 106 and receives a content encryption key 124 (CEK). The media server 126 can then utilize the content encryption key to re-encrypt the formatted (e.g., transcoded) media content.

The media server 126 includes a transcoder 134 to format the decrypted media content for distribution to the client device 128 as media content segments 136 with an HTTP server 138 via the router 130. An exemplary transcoder 134 can perform reprocessing of compressed video from one bit rate to another (e.g., transrating), and/or from one resolution to another (e.g., transsizing from a high definition TV resolution to a standard definition TV resolution), and/or from one standard to another (for example, MPEG-2 to H.264, or MPEG-4 to MPEG-2). In an illustrative example, transcoder 134 can transcode media content to provide the media content in an available resolution of the media rendering system 140 in the client device 128. In a further exemplary embodiment, the media server can reformat high-definition media content received from the set-top box 102, such as MPEG-4 media content, to a desired format for distribution to client device 128, such as to VGA formatted media content, or to MPEG-2 encoded data.

A transcoder queue 135 is provided at the media server 126. The transcoder queue 135 is used by the transcoder 134, and provides an order or sequence in which the transcoder 134 is to transcode media content, such as media content not previously transcoded by the media server 126. In an embodiment, the transcoder queue 135 can be stored in the transcoder 134 or in media server 126, e.g., in a local memory or data storage device coupled to a processor of media server 126. In an illustrative embodiment, the transcoder queue 135 can be implemented as a data structure; for example, as an array of references to objects such as instances of content program class 312 (shown in FIG. 2 and described below).

The order of elements in the transcoder queue 135 can be altered by the media server 126; for example, an API call may be used to cause a processor of media server 126 to move a specified instance of a content program class 312 to the top (i.e., first sequential position) of the transcoder queue 135, thereby increasing the transcoding priority of the specified instance of the content program class 312. In alternative embodiments, an API call may be used to cause a processor of media server 126 to move a specified instance of a content program class 312 to the bottom (i.e., last sequential position) of the transcoder queue 135, or to any other specified position in the transcoder queue 135, or to increment or decrement the position in the transcoder queue 135. Accordingly, the media server 126 can respond to a request, such as an API call or an object message, by altering the transcoding priority of the specified instance of the content program class 312.

In an embodiment, after transcoding is performed on media content, the media server 126 is implemented to re-encrypt the formatted media content with the encryption key for communication to the client device via the router 130, so that the media content remains secure when communicated over a wired or wireless communications network (e.g., WiFi™ or Ethernet) to the client device.

The media server 126 can be implemented with various components, such as a processor and memory devices, as well as with any combination of differing components as further described with reference to the example electronic device shown in FIG. 5. For example, the media server 126 can include memory that is implemented to buffer the media content segments 136 that are transcoded and maintained for delivery to the client device 128. Further, although shown as an independent component or device, the media server 126 may be implemented as an integrated component or device of the set-top box 102. Alternatively, the media server 126 may be implemented as a network-based media server (e.g., in the cloud) to decrypt the encrypted media content, transcode the decrypted media content, and re-encrypt the formatted media content for distribution to the client device as encrypted, formatted media content.

In implementations, the media server 126 can serve as a portal server, the media content server, as well as a domain server. The client device 128 can discover a server name of the media server that can be used to resolve an IP address for the media server. The media server supports Multicast DNS (mDNS) for the name discovery and IP address resolution mechanism. The mDNS protocol allows the client device to discover the media server by obtaining its fully-qualified name and IP address. The client device can first multicast a query looking for the media server and then the media server's mDNS server responds by providing the fully qualified name (FQN) and IP address. The client device can then build its name resolution table and, when the media server FQN is used in an HTTP URI, the message will be sent to the media server correctly.

The client device 128 may be implemented as any one or combination of a communication, computer, media playback, gaming, entertainment, and/or electronic device, such as a mobile phone or tablet device that can be configured as a television client device to receive and playback media content. The client device can be implemented with various components, such as processor and memory devices, as well as with any combination of differing components as further described with reference to the example electronic device shown in FIG. 5. For example, the client device includes a media rendering system 140 to playback media content for viewing on an integrated display device.

The client device can also include various client applications, such as a media player 142 that is implemented to manage the media content playback, as well as a proxy application 144 that can be implemented as computer-executable instructions, such as a software application, and executed by one or more processors to implement the various embodiments of altering transcoding priority for media content described herein. The client device can also include additional software and applications, such as the software stack 146 that is further described with reference to FIG. 2.

In embodiments, the proxy application 144 is implemented to receive the media content that is formatted and encrypted from the media server 126, such as being received wirelessly via the router 130. The proxy application can initiate storing the encrypted, formatted media content as the encrypted content 148 in data storage 150 on the client device 128. The proxy application is also implemented to request the content encryption key 124, receive the encryption key from the key server 122, and store the encryption key in the data storage 150 on the client device. In embodiments, the proxy application can receive encryption key request parameters from the media server 126, and utilize the encryption key request parameters to request the content encryption key 124 from the key service 120.

When the proxy application 144 receives a request for the media content from the media player, the proxy application can retrieve the encryption key and the encrypted media content from the data storage 150 on the client device. The proxy application 144 then decrypts segments of the encrypted media content with the encryption key, and communicates the decrypted media content segments to the media player 142 for playback on the client device. Accordingly, the media player operates as if performing a progressive download against clear content and is totally agnostic of the media content being received and/or stored as encrypted media content and then decrypted by the proxy application.

In embodiments, the media content can be decrypted by the proxy application for playback by the media player as segments of the media content are received for an implementation of altering transcoding priority. Alternatively or in addition, the media content can be downloaded and stored locally, and later decrypted and played back when the client device is no longer communicatively linked in the local network, such as when a user is traveling and wanting to display the media content (e.g., watch a recorded movie or television program). The client device can list and describe media server content; support progressive download of the media content; protect the media content transport and storage; enforce digital rights management (DRM) rules; support content playback with the media player; enforce domain control; and/or personalize and register user devices.

In embodiments, the proxy application 144 instantiates the media player 142 with an obfuscated URL pointing to itself, and the media player can determine the proxy application from the URL. The obfuscated URL can be generated randomly with a different value for each progressive download and/or local playback session, and the URL points back to the proxy application so that the media player knows where to request the media content from for playback. On the client device 128, the proxy application 144 executes first, and when a user of the client device initiates a request for media content playback, the proxy application generates the obfuscated URL and instantiates the media player 142. The media player can then communicate with the proxy application via an HTTP request and HTTP response. For example, when the media player requests media content from the proxy application, the proxy application, in turn, can request the media content from the media server or get the media content from locally stored content.

Figure 2:
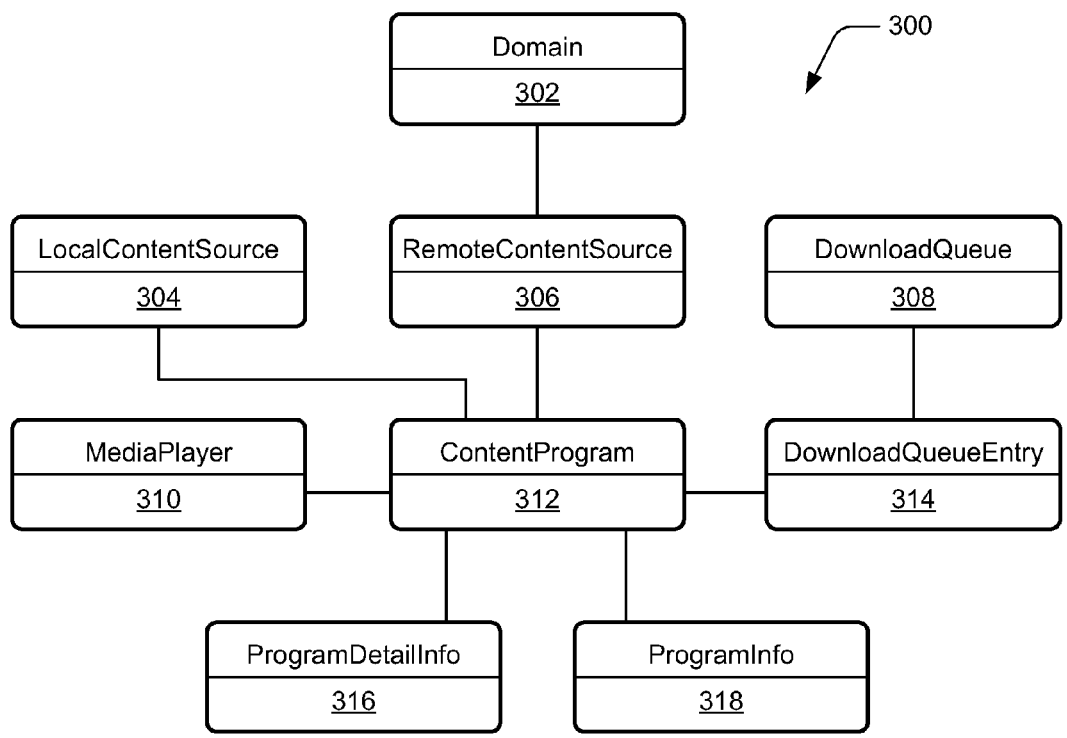
FIG. 2 illustrates an example client device API object model in embodiments of altering transcoding priority for media content.

FIG. 2 illustrates an example client device API object model 300 that can be implemented on a client device, such as the client device 128 described with reference to FIG. 1. The client object model 300 includes a set of classes, the associated methods, and the relationships between the classes, as configured by the client device SDK 204 described with reference to FIG. 2. A domain controller can be instantiated from the domain class 302 for overall control of the object model and to control the domain discovery of the media server 126, the domain-based registration of the client device with the media server, and authentication of the client device 128 to the media server 126 so that the client device is trusted to receive the encrypted, formatted media content from the media server.

In addition to the domain class 302, the object model 300 includes a local content source class 304; a remote content source class 306; a download queue class 308; a media player class 310 (e.g., such as to instantiate the media player 142 in the client device 128); a content program class 312; a download queue entry class 314; a program detail info class 316; and a program info class 318. The local content source class 304 includes functionality to control the media content that is already securely downloaded and maintained on the client device 128. The local content source class also controls displaying metadata that corresponds to the media content and deletion of the metadata.

The remote content source class 306 represents the media server 126 and includes functionality to interface with the media server. The remote content source class also provides methods to retrieve a remote content list and download remote media content, such as remote media content that can be streamed to the client device. Remote media content usage control can be enforced, for example, by an Intellectual Property Rights Management (IPRM) system according to its copyrights. A remote content list includes the state of all the different remote media content and is sorted by the content state. An update to the remote content list is notified via a multicast domain name service (mDNS) message, and can provide attributes of the media content, such as the ID, descriptions, parental control information, playback duration, ratings, the content file URLs, the icon URLs, protection type, series name, and the episode name.

The download queue entry class 314 includes functionality to manage the media content that is scheduled to download to the client device, and the download queue class 308 provides methods to manage download queue entry. Before media content is fully downloaded from the media server to the client device, the media content is an entry in a download queue. The download queue class 308 can manage a deletion from the download queue, a stop and restart of a download, a change of the media content download order, a report of media content download progress. Further, downloaded media content is protected by the IPRM system, can be stored persistently on the client device, and the media content is playback ready (e.g., the audio/video data of the media content can be rendered with or without connection to the remote content source). The metadata that corresponds to the media content can also be stored persistently on the client device.

The media player class 310 represents the media player 142 that is instantiated by the proxy application 144, and includes functionality to control playback of recorded media content and/or streaming media content on the client device. The playback of the recorded media content, and playback of the streaming media content, are both different instantiations of the media player class.

The content program class 312, in an embodiment, represents one of local recorded media content (e.g., the local content source class 304) or remote streaming media content (e.g., the remote content source 306). In an exemplary implementation of a content program class 312, the class contains the basic information and methods of an individual program, and includes public member functions. In an embodiment, basic information for a program includes, for example, a channel number associated with the program, a name associated with the program, a showtime associated with the program, a rating associated with the program, a status (which can indicate, for example, if the program has been downloaded, or is allowed to be downloaded), and a reference to the remote content source on which the program is stored.

In an embodiment, content program class 312 includes a public member function to move the selected program to the top of the transcoding queue; for example, a top of queue method (e.g., a method referred to herein by the name "topOfXQueue"), which can have a return value to indicate an error condition. For example, in an embodiment, the top of queue method will return an error if the program has already been transcoded. If the top of queue method is successful, in an embodiment, the remote content source will send a remote content update notification to notify that the program list has changed, since the selected program will now be higher on the list.

In an embodiment, content program class 312 also includes a public member function to download the content program (e.g., a method referred to herein by the name "addToDownloadQueue"). In an embodiment, content program class 312 also includes a public member function to download detailed information about the content program (e.g., a method referred to herein by the name "downloadDetailInfo"), for downloading metadata such as a program description and credits.

The program detail information class 316 includes metadata corresponding to the media content, and the program information class 318 includes information about an individual program.

Example methods 400 and 500 are described with reference to respective FIGS. 3 and 4 in accordance with one or more embodiments of altering transcoding priority for media content. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
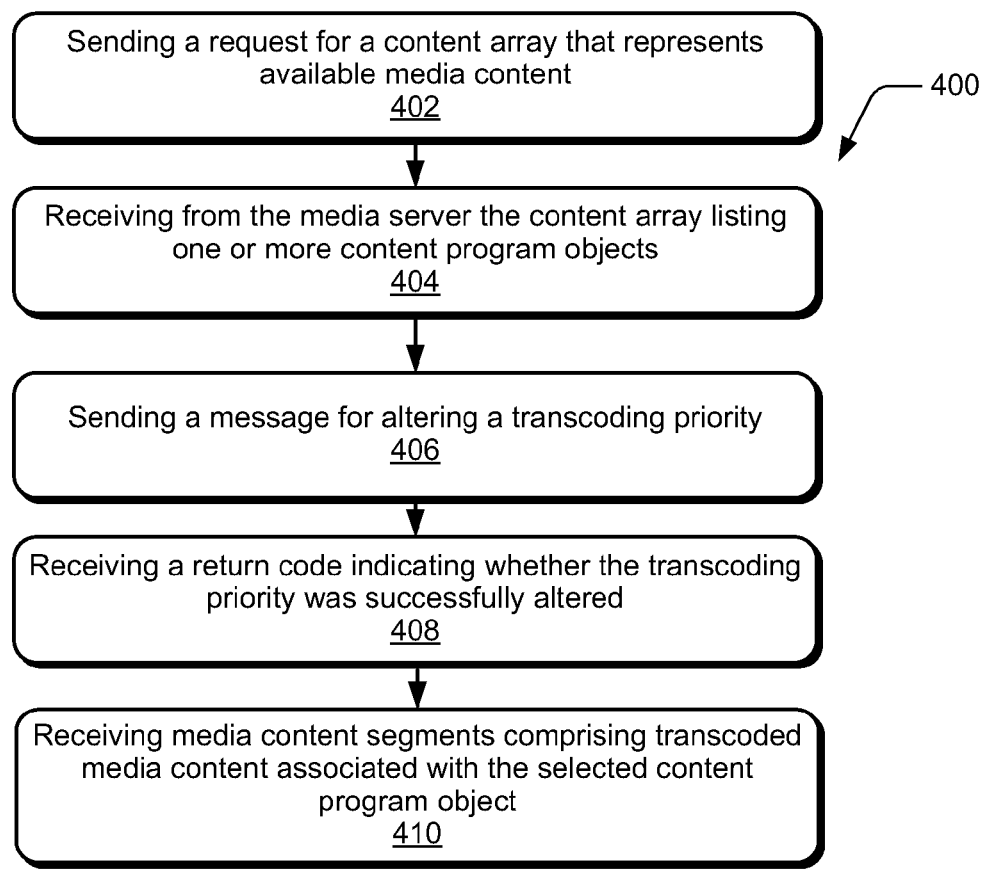
FIG. 3 illustrates example method(s) of altering transcoding priority for media content in accordance with one or more embodiments.

FIG. 3 illustrates example method(s) 400 of altering transcoding priority for media content, and is described with reference to embodiments of a client device 128 (FIG. 1). The order in which the method blocks are described are not intended to be construed as a limitation, and any number or combination of the described method blocks can be combined in any order to implement a method, or an alternate method.

At block 402, the client device 128 sends, to a media server 126, a request for a content array that represents media content to be available from the media server 126. For example, the media content may have been previously downloaded to the media server 126, or in a further embodiment, the media content may be available to be downloaded to the media server 126.

At block 404, the client device 128 receives the content array from the media server 126, the content array listing one or more content program objects. Each of the one or more content program objects represents media content to be available from the media server 126. For example, in an embodiment, the content array represents only media content not previously transcoded by the media server 126, and in another embodiment, at least some (but not necessarily all) of the one or more content program objects represent media content not previously transcoded by the media server 126.

At block 406, the client device 128 sends, to the media server 126, a message for altering a transcoding priority of a selected content program object. The selected content program object represents media content not previously transcoded by the media server 126. In some embodiments, the media server 126 then sends to the selected content program object a message for altering a transcoding priority of the selected content program object.

At block 408, the client device 128 receives, from the media server 126, a return code for indicating whether the transcoding priority of the selected content program object was successfully altered in response to the message. In some embodiments, the selected content program object sends the return code to the media server 126 and the media server 126 delivers the return code to client device 128.

In further embodiments, at block 410, the client device 128 receives media content segments comprising transcoded media content associated with the selected content program object.

Figure 4:
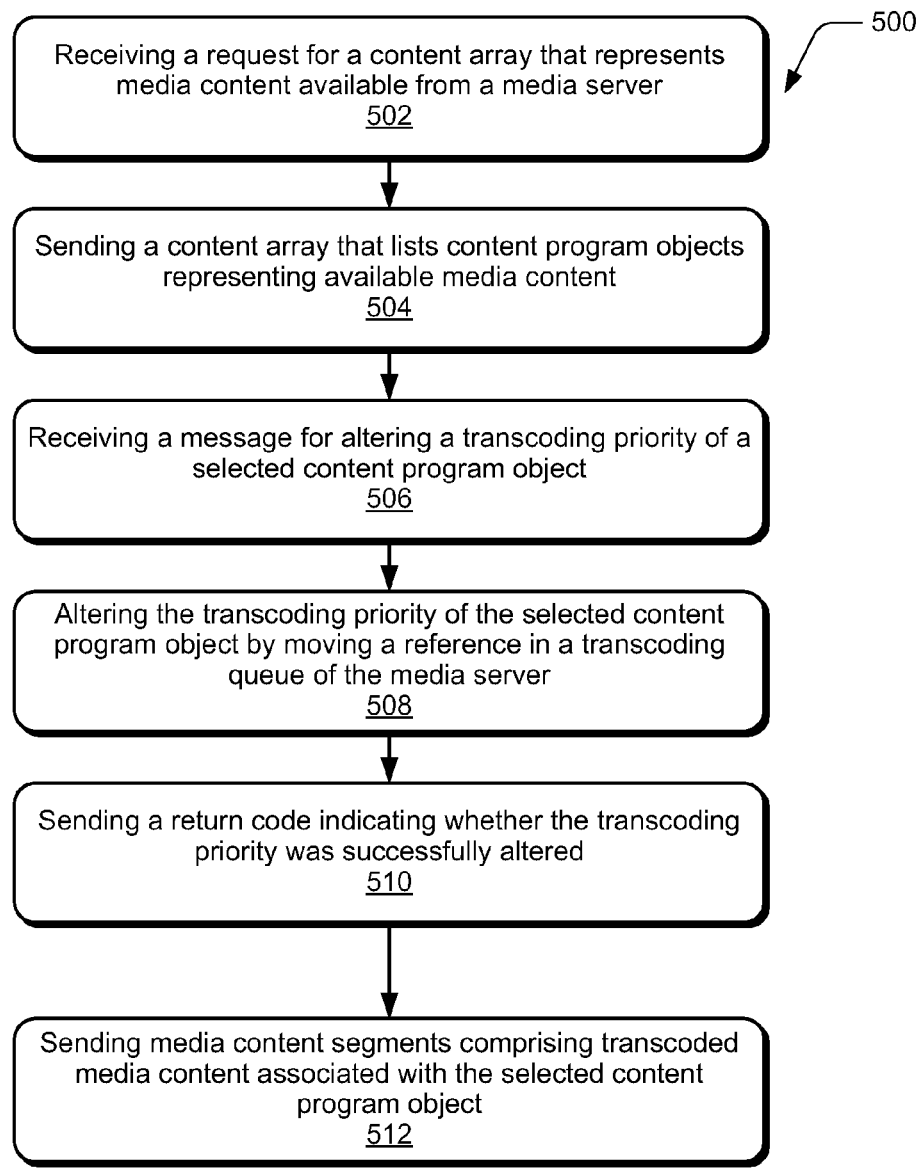
FIG. 4 illustrates example method(s) of altering transcoding priority for media content in accordance with one or more embodiments.

FIG. 4 illustrates example method(s) 500 of altering transcoding priority for media content, and is described with reference to embodiments of a media server 126. The order in which the method blocks are described are not intended to be construed as a limitation, and any number or combination of the described method blocks can be combined in any order to implement a method, or an alternate method.

At block 502, a media server 126 receives a request from a client device 128 for a content array that represents media content to be available from the media server 126. For example, the media content may have been previously downloaded to the media server 126, or in a further embodiment, the media content may be available to be downloaded to the media server 126

At block 504, the media server 126 sends the content array to the client device. The content array lists one or more content program objects. Each of the one or more content program objects represents media content to be available from the media server 126. For example, in an embodiment, the content array represents only media content not previously transcoded by the media server 126, and in another embodiment, at least some (but not necessarily all) of the one or more content program objects represent media content not previously transcoded by the media server 126.

At block 506, the media server 126 receives a message for altering a transcoding priority of a selected content program object. The selected content program object represents media content not previously transcoded by the media server 126. In an exemplary embodiment, the media server 126 provides to a selected content program object (e.g., a content program object at the media server 126) a message for altering a transcoding priority of the selected content program object.

At block 508, the media server 126 alters the transcoding priority of the selected content program object, e.g., by moving a reference to the selected content program object in a transcoding queue of the media server 126. In an exemplary embodiment, a method of the selected content program object causes the media server 126 to alter the transcoding priority of the selected content program object.

At block 510, the media server 126 returns a return code. The return code indicates whether the transcoding priority of the selected content program object was successfully altered in response to the message. In an exemplary embodiment, the selected content program object provides the return code to the media server 126.

In further embodiments, at block 512, the media server 126 sends, to the client device 128, media content segments comprising transcoded media content associated with the selected content program object.

Figure 5:
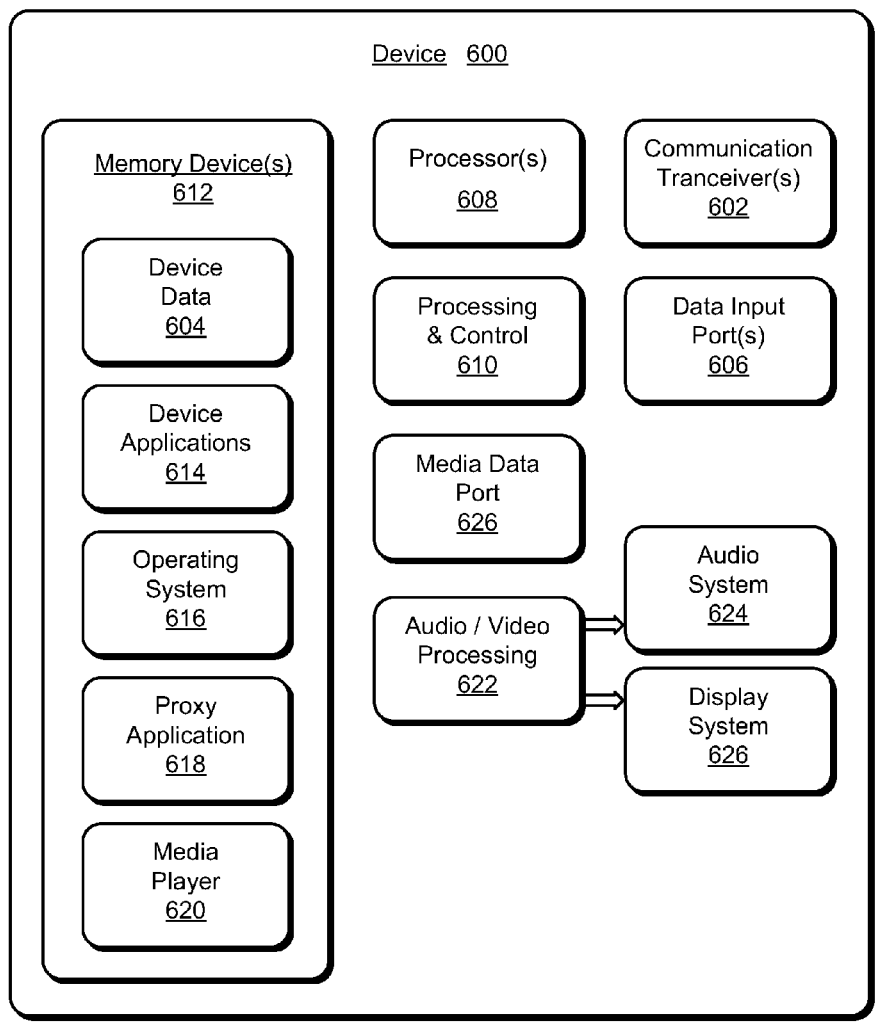
FIG. 5 illustrates various components of an example electronic device that can implement embodiments of altering transcoding priority for media content.

FIG. 5 illustrates various components of an example electronic device 600 that can be implemented as any device described with reference to any of the previous FIGS. 1-4. In embodiments, the electronic device may be implemented as a media server or a client device, such as described with reference to FIG. 1. Alternatively or in addition, the electronic device may be implemented in any form of device that can receive and playback live or recorded video content, such as any one or combination of a communication, computer, media playback, gaming, entertainment, mobile phone, and/or tablet computing device.

The electronic device 600 includes communication transceivers 602 that enable wired and/or wireless communication of device data 604, such as received data, data that is being received, data scheduled for broadcast, data packets of the data, etc. Example transceivers include wireless personal area network (WPAN) radios compliant with various IEEE 802.15 (Bluetooth™) standards, wireless local area network (WLAN) radios compliant with any of the various IEEE 802.11 (e.g., WiFi™) standards, wireless wide area network (WWAN) radios for cellular telephony, wireless metropolitan area network (WMAN) radios compliant with various IEEE 802.15 (WiMAX™) standards, and wired local area network (LAN) Ethernet transceivers.

The electronic device 600 may also include one or more data input ports 606 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the electronic device to components, peripherals, or accessories such as microphones and/or cameras.

The electronic device 600 includes one or more processors 608 (e.g., any of microprocessors, controllers, and the like), which process computer-executable instructions to control operation of the device. Alternatively or in addition, the electronic device can be implemented with any one or combination of software, hardware, firmware, or fixed logic circuitry that is implemented in connection with processing and control circuits, which are generally identified at 610. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 600 also includes one or more memory devices 612 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The electronic device 600 may also include a mass storage media device.

A memory device 612 provides data storage mechanisms to store the device data 604, other types of information and/or data, and various device applications 614 (e.g., software applications). For example, an operating system 616 can be maintained as software instructions within a memory device and executed on the processors 608. The device applications may also include a device manager, such as any form of a control application, software application, signal-processing and control module, code that is native to a particular device, a hardware abstraction layer for a particular device, and so on. The electronic device may also include a proxy application 618 and a media player 620, such as for a client device, to implement embodiments of altering transcoding priority for media content.

The electronic device 600 also includes an audio and/or video processing system 622 that generates audio data for an audio system 624 and/or generates display data for a display system 626. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 626. In implementations, the audio system and/or the display system are external components to the electronic device. Alternatively, the audio system and/or the display system are integrated components of the example electronic device.

FIGS. 6-13 illustrate an API object model communication sequence diagrams between exemplary components, devices, and entities in a client object model domain in accordance with one or more embodiments of a client object model architecture. The client object model 300 described with reference to FIG. 2 includes the set of classes, the associated methods, and shows the relationships between the classes. The client object model includes the set of APIs to implement the object model, and the object model communication sequence diagrams shown in FIGS. 6-13 illustrates an exemplary object model API in accordance with an embodiment. Further, a Representational State Transfer (REST) software architecture is described below as the REST API specification that includes the API definitions of the object model classes that are described with reference to the client object model 300 shown in FIG. 2.

Figure 6:
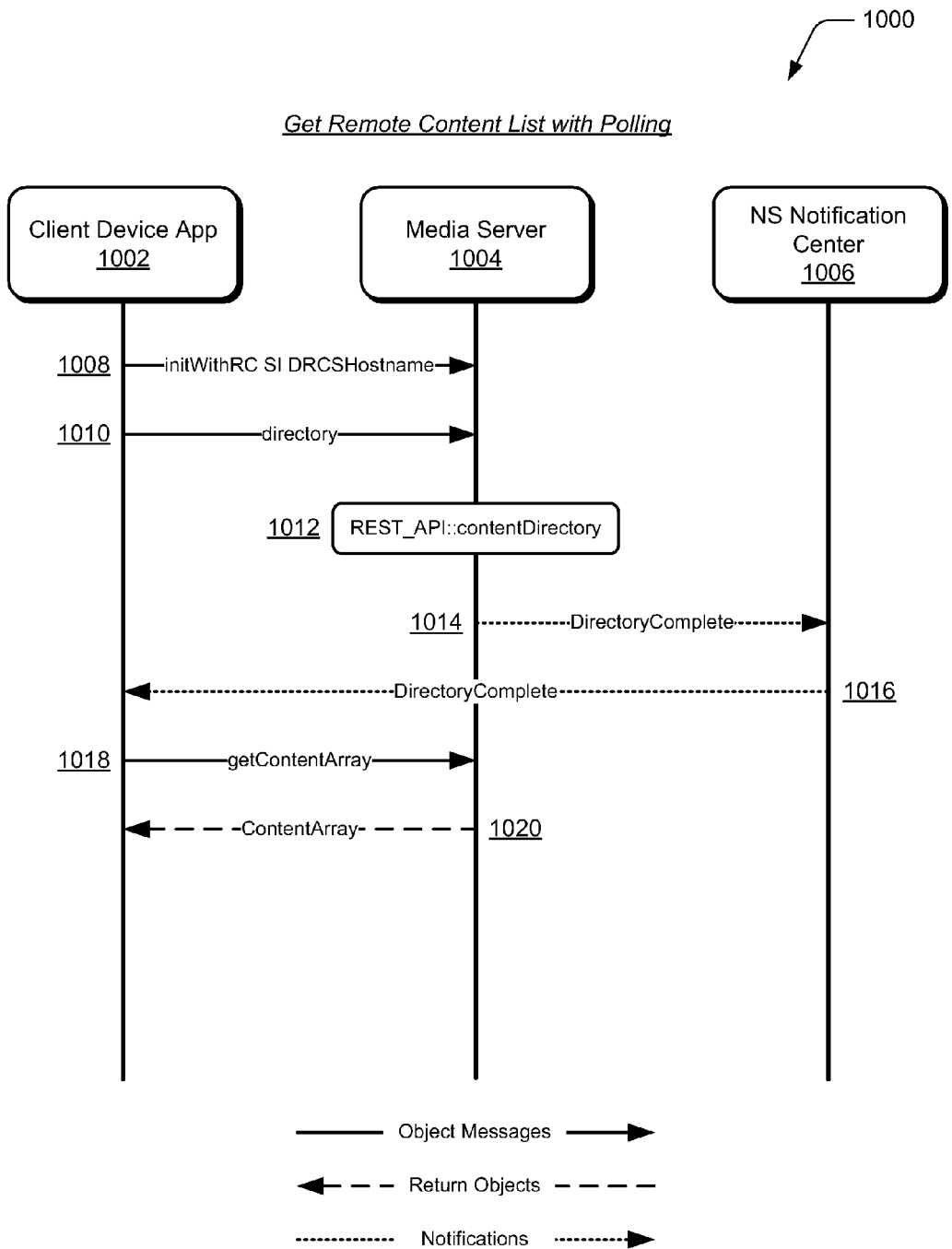
FIGS. 6-13 illustrate an API object model communication sequence diagrams between the components, devices, and entities in a domain system in accordance with one or more embodiments.

FIG. 6 illustrates an example of a Get Remote Content List with Polling communication sequence 1000 between a client device application 1002, a media server 1004 (also referred to herein as a remote content source), and an NS notification center 1006 to obtain a remote content list from the media server. The media server 1004 is an example of the media server 126, and the client device application 1002 can be implemented on the client device 128 as described with reference to FIG. 1. In the example communication sequence 1000, the client device application 1002 initiates an object message 1008 (initWithRC SI DRCS Hostname), and initiates a directory object message 1010. The media server 1004 references the REST API content directory URI 1012 that provides the list of programs currently in the media server database, such as described below with reference to the content directory URI in the REST API specification. The media server communicates a directory complete notification 1014 to the NS notification center 1006, which returns a directory complete notification 1016 to the client device application. The client device application then communicates a get content array object message 1018 to the media server, which replies with a content array return object 1020.

Figure 7:
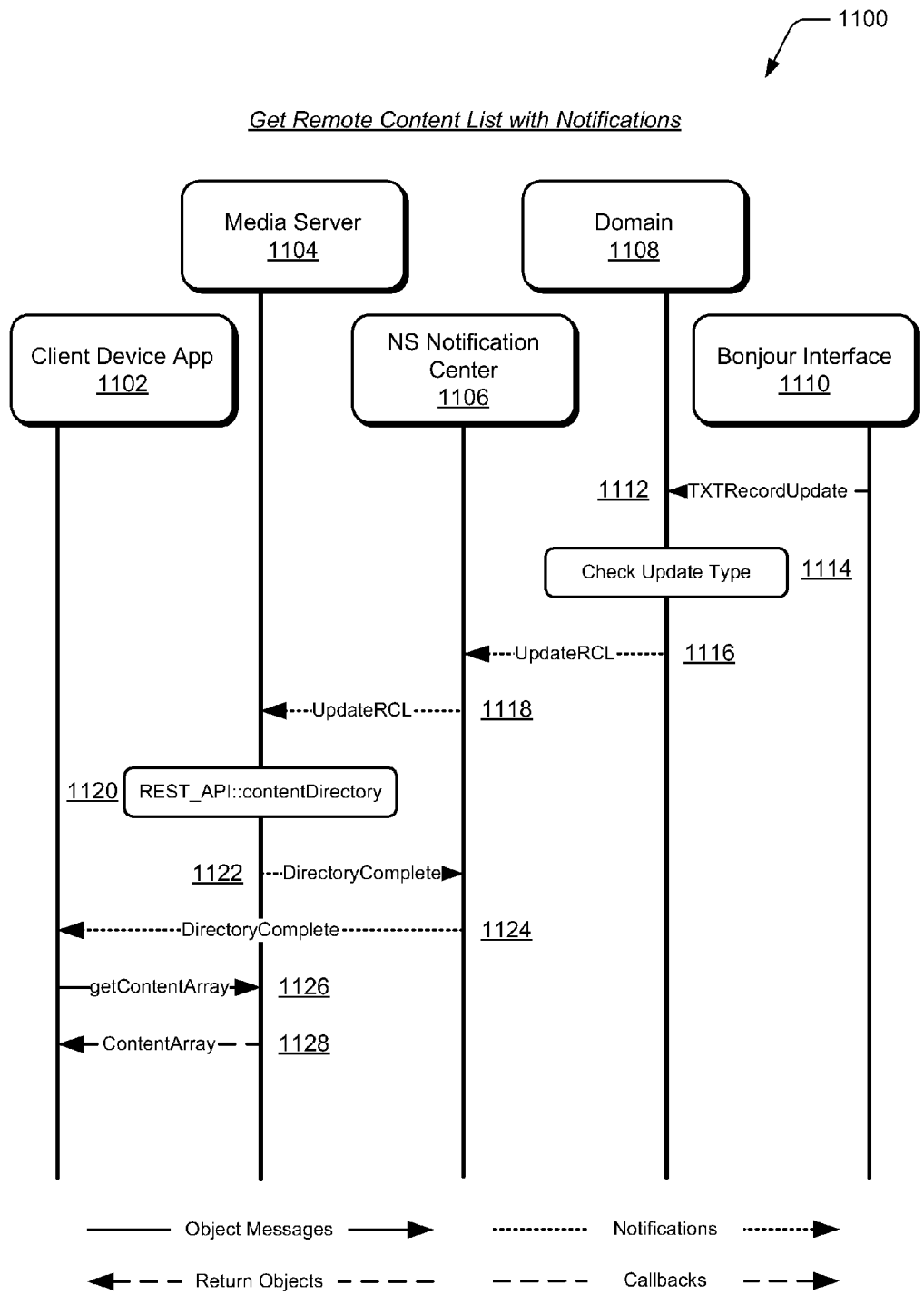

FIG. 7 illustrates an example of a Get Remote Content List with Notifications communication sequence 1100 between a client device application 1102, a media server 1104, an NS notification center 1106, a domain 1108, and an interface 1110 to obtain a remote content list with notifications. The media server 1104 is an example of the media server 126, and the client device application 1102 can be implemented on the client device 128 as described with reference to FIG. 1. Further, the domain 1108 is an example of the domain class 302 described with reference to FIG. 2, from which a domain controller can be instantiated for overall control of the object model. In the example communication sequence 1100, the interface 1110 communicates a TXT record update object message 1112 to the domain 1108, which initiates a check update type 1114 of remote media content. The domain communicates an update RCL notification 1116 to the NS notification center 1106, which communicates the update RCL notification (at 1118) to the media server 1104. The media server references the REST API content directory URI 1120 that provides the list of programs, such as described below with reference to the content directory URI in the REST API specification.

Figure 8:
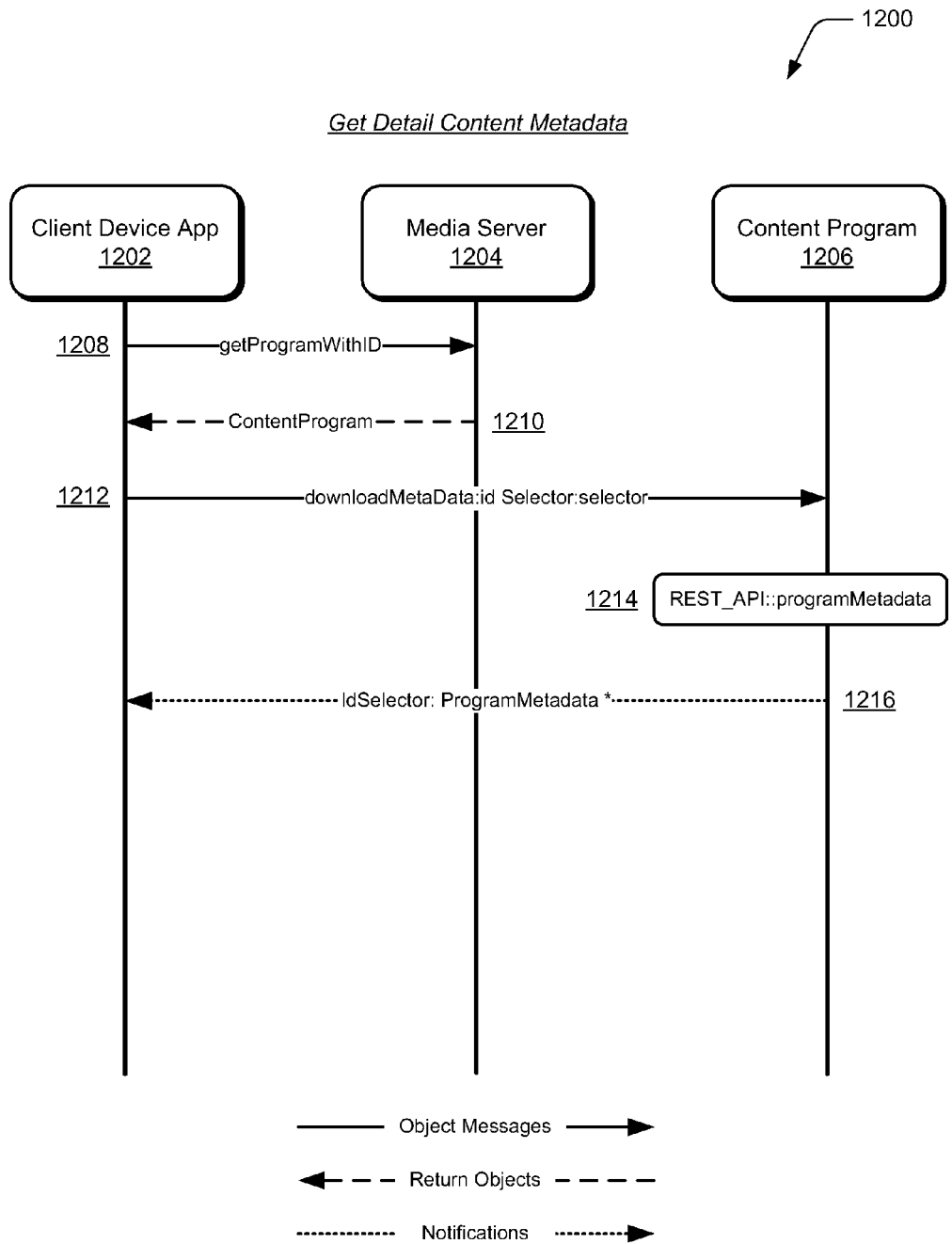

FIG. 8 illustrates an example of a Get Detail Content Metadata communication sequence 1200 between a client device application 1202, a media server 1204, and a content program object 1206 to obtain media content metadata from the media server. The media server 1204 is an example of the media server 126, and the client device application 1202 can be implemented on the client device 128 as described with reference to FIG. 1. Further, the content program object 1206 is an example of the content program class 312 in the client device API object model 300 described with reference to FIG. 3, and the content program class 312 represents one of local recorded media content (e.g., the local content source class 304) or remote streaming media content (e.g., the remote content source 306).

In the example communication sequence 1200, the client device application 1202 initiates a get program with ID object message 1208 to the media server 1204, which returns a content program object 1210. The client device application then communicates a download metadata object message 1212 (download metadata:id selector:selector) to obtain the content program 1206. The media server 1204 references the REST API program metadata URI 1214, which can be used to download the detailed program representation of any program using the program-id as described below with reference to the program metadata URI in the REST API specification. A program metadata notification 1216 (Id selector: program metadata) is then communicated back to the client device application.

The media server 1104 communicates a directory complete notification 1122 to the NS notification center 1106, which returns a directory complete notification 1124 to the client device application 1102. The client device application then communicates a get content array object message 1126 to the media server, which returns a content array object 1128.

Figure 9:
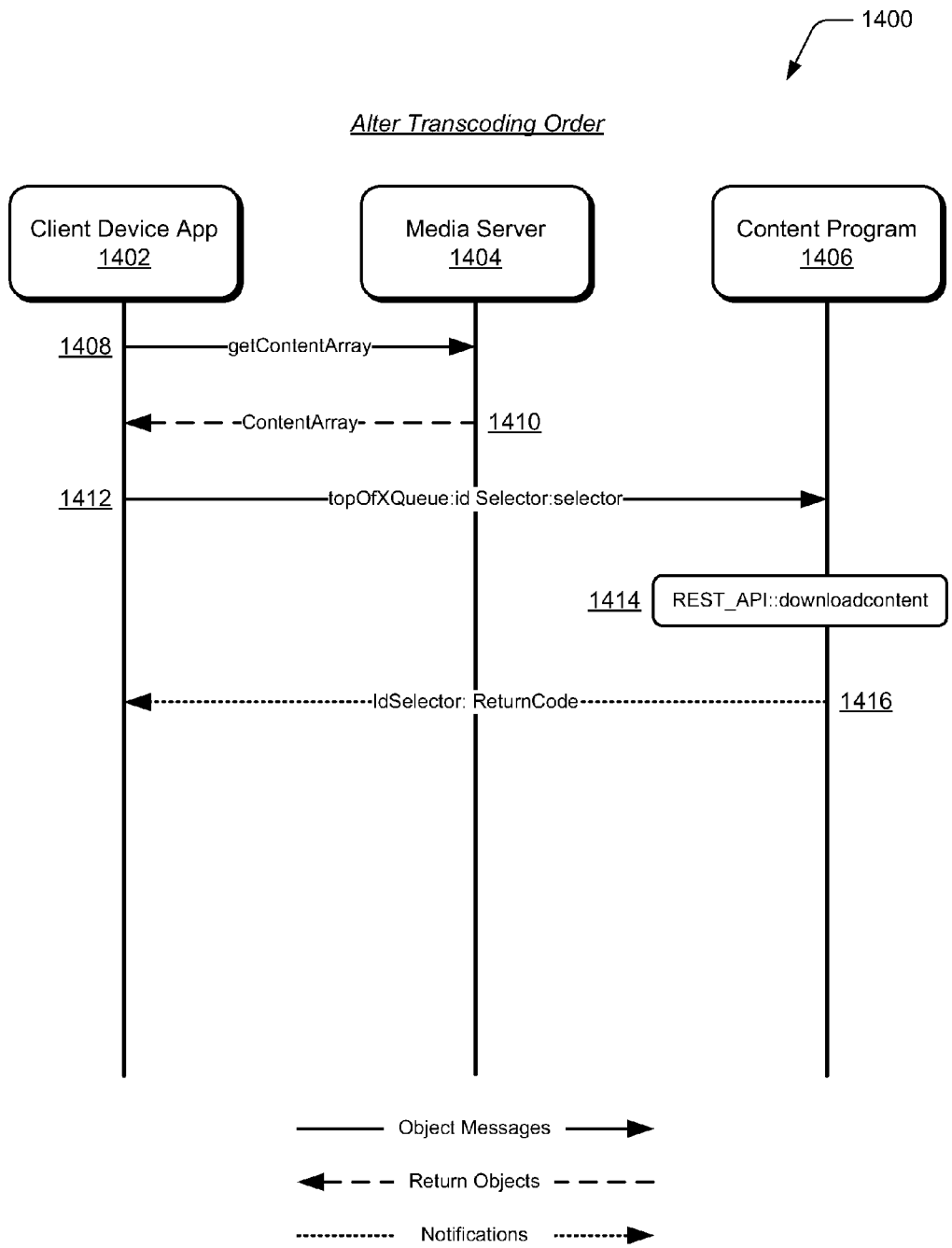

FIG. 9 illustrates an example of an Alter Transcoding Order communication sequence 1400 between a client device application 1402, a media server 1404, and a content program object 1406 to alter an order of media content transcoding at the media server. The media server 1404 is an example of the media server 126, and the client device application 1402 can be implemented on the client device 128 as described with reference to FIG. 1. Further, the content program object 1406 is an example of the content program class 312 in the client device API object model 300 described with reference to FIG. 2, and the content program class 312 represents one of local recorded media content (e.g., the local content source class 304) or remote streaming media content (e.g., the remote content source 306).

In the example communication sequence 1400, the client device application 1402 initiates a get content array object message 1408 to the media server 1404, which returns the content array object 1410 to the client device application. The client device application then communicates a message. In an embodiment, the message is sent to or via the media server 1404. In an embodiment, the message is delivered (e.g., by the media server 1404) to the content program object 1406. In an embodiment, the message is a top of queue object message 1412 (e.g., topOfXQueue, as discussed above with reference to FIG. 2, depicted in FIG. 9 as topOfXQueue:id Selector: selector).

In an illustrative embodiment, the content program object references the REST API download content URI 1414; for example, by calling a Transcode Priority URI, such as http://{content-server}/content/{program-id}, that includes a GET method for causing transcoding priority to be raised (e.g., raised to the top of a transcoding queue of transcoder 134 in FIG. 1), and receiving a return value. The content program object then returns (e.g., to the media server 1404, or via the media server 1404 to the client device app 1402) a return code notification 1416 for the return value to the client device application. In an illustrative example, the return value 200 indicates the priority of the requested program has been raised. The return value 404 indicates program not found. The return value 405 indicates the priority of the requested program cannot be raised.

Figure 10:
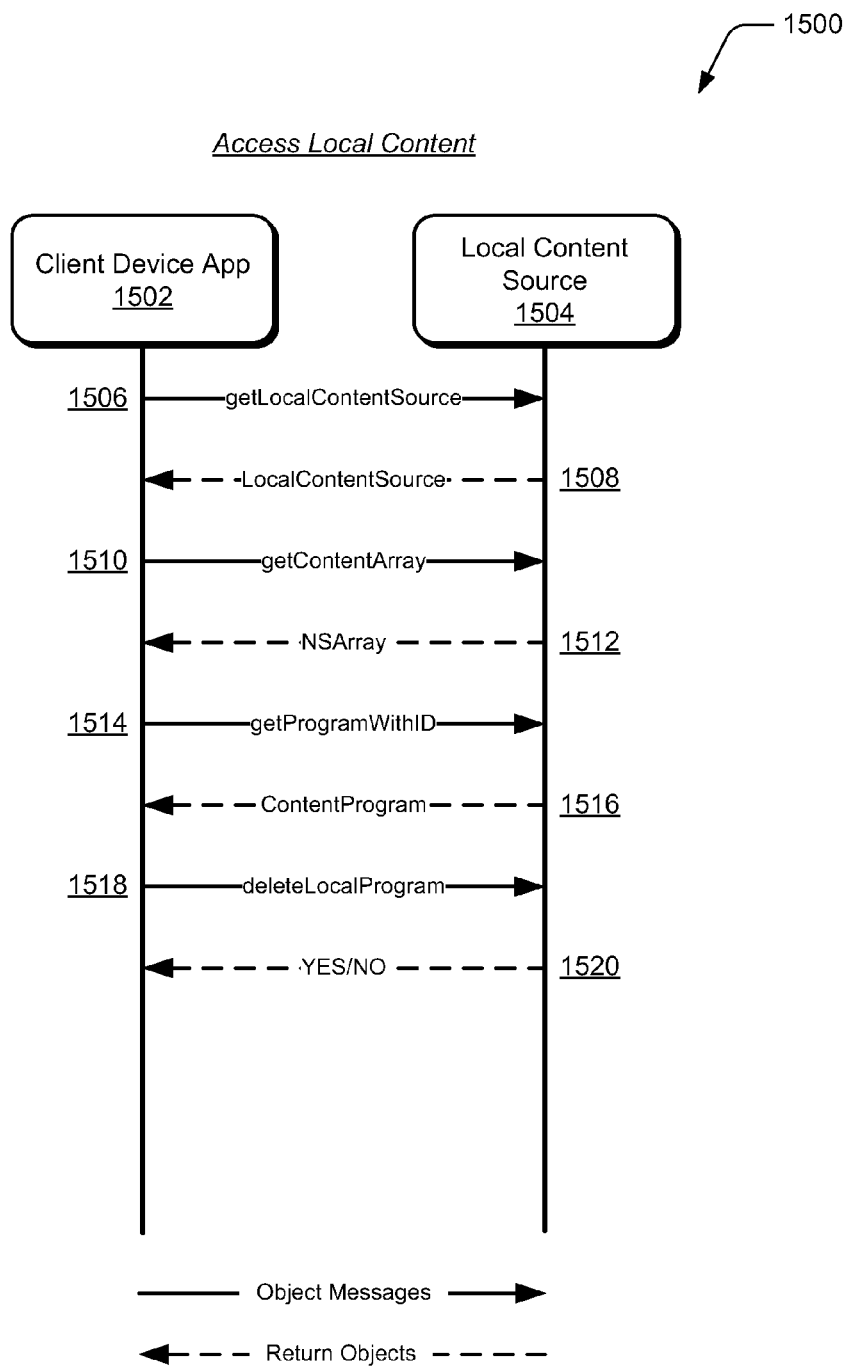

FIG. 10 illustrates an example of an Access Local Content communication sequence 1500 between a client device application 1502 and a local content source object 1504 (e.g., data storage on the client device). The client device application 1502 can be implemented on the client device 128 as described with reference to FIG. 1. Further, the local content source object 1504 is an example of the local content source class 304 in the client device API object model 300 described with reference to FIG. 2. The local content source class 304 includes functionality to control the media content that is already securely downloaded and maintained on the client device 128.

In the example communication sequence 1500, the client device application 1502 initiates a request for local media content as a get local content source object message 1506, and the local content source object 1504 returns a local content source object 1508 to the client device application. The client device application then communicates a get content array object message 1510 to the local content source object, which returns an NS array object 1512 to the client device application. The client device application then communicates a get program with ID object message 1514 to the local content source object, which returns a content program object 1516 to the client device application. The client device application then communicates a delete local program object message 1518 to the local content source object, which returns a yes or no object 1520 to the client device application.

Figure 11:
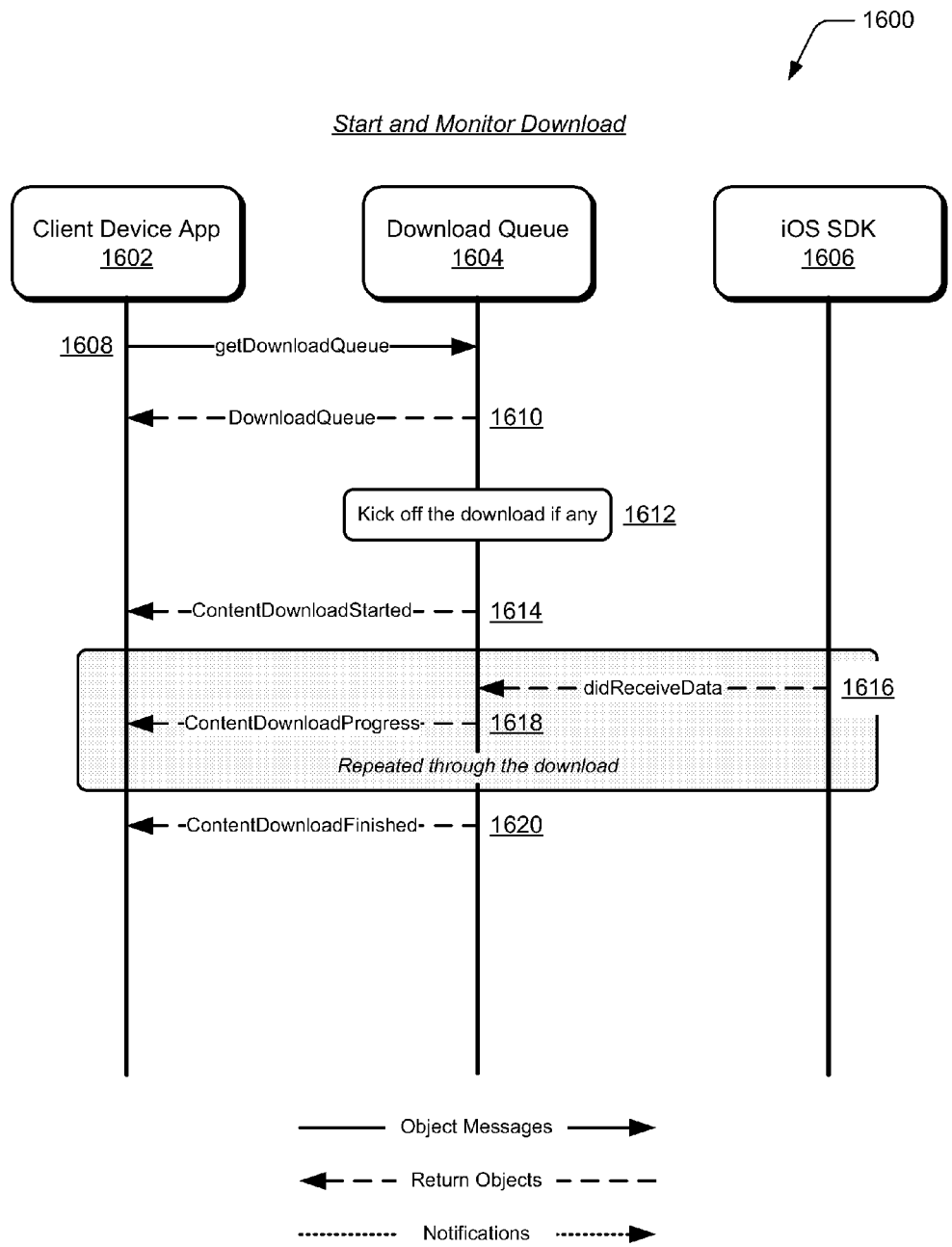

FIG. 11 illustrates an example of a Start and Monitor Download communication sequence 1600 between a client device application 1602, a download queue object 1604, and an iOS SDK 1606 to start and monitor a media content download to the client device. The client device application 1602 can be implemented on the client device 128 as described with reference to FIG. 1. Further, the download queue object 1604 is an example of the download queue class 308 in the client device API object model 300 described with reference to FIG. 2. The download queue class 308 provides methods to manage download queue entry for media content that is queued to download to the client device. The iOS SDK 1606 is an example of the operating system SDK 206 in the software stack 146 that is shown in FIG. 2, and can be implemented in the client device 128.

In the example communication sequence 1600, the client device application 1602 initiates a get download queue object message 1608 to the download queue object 1604, which returns the download queue return object 1610 to the client device application. The download queue object 1604 then begins a download 1612 of media content to the client device (if applicable), and can communicate a content download started object 1614 to the client device application. The iOS SDK 1606 communicates a did receive data return object 1616 to the download queue object 1604, which then communicates a content download progress object 1618 to the client device application. The did receive data return object 1616 from the iOS SDK and the content download progress object 1618 from the download queue object 1604 to the client device application is repeated through the download of the media content to the client device. The download queue object 1604 can then communicate a content download finished object 1620 to the client device application.

Figure 12:
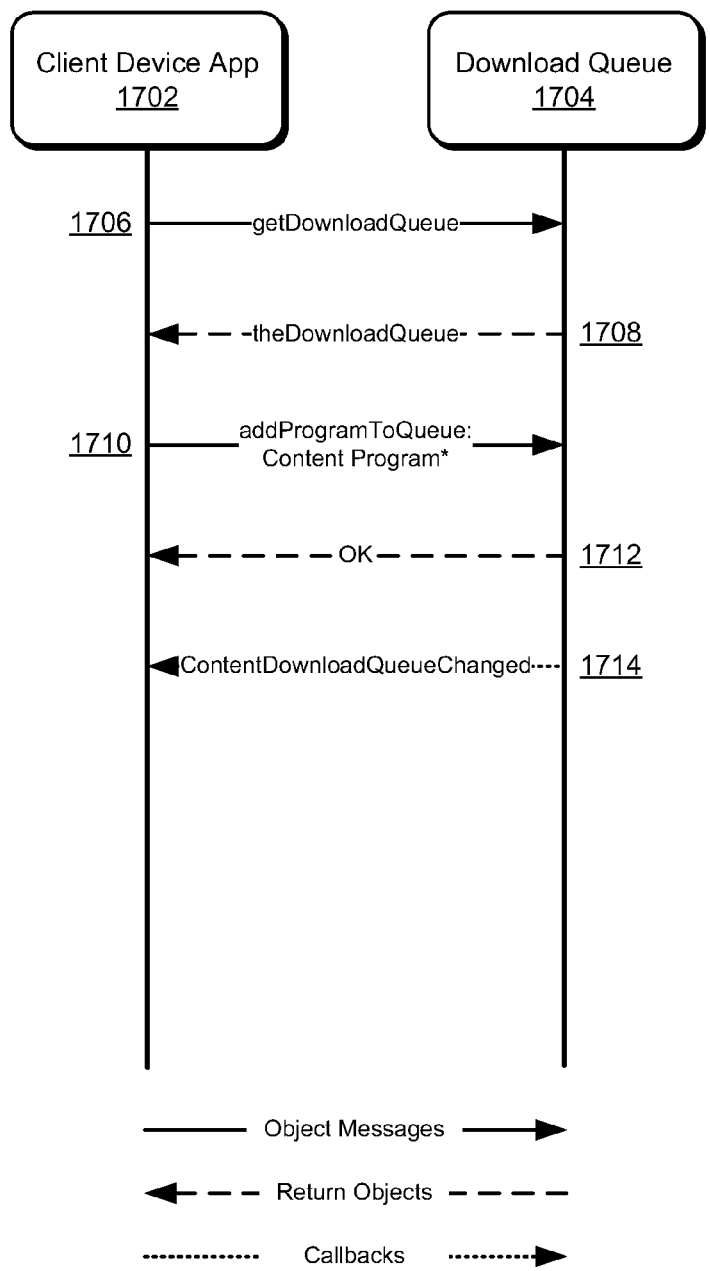

FIG. 12 illustrates an example of an Add Download Queue Entries communication sequence 1700 between a client device application 1702 and a download queue object 1704 to add additional media content to the sequence of media content in the download queue for download to the client device. The client device application 1702 can be implemented on the client device 128 as described with reference to FIG. 1. Further, the download queue object 1704 is an example of the download queue class 308 in the client device API object model 300 described with reference to FIG. 2. The download queue class 308 provides methods to manage download queue entry for media content that is queued to download to the client device.

In the example communication sequence 1700, the client device application 1702 initiates a get download queue object message 1706 to the download queue object 1704, which returns the download queue return object 1708 to the client device application. The client device application then communicates an add program to queue object message 1710 (add program to queue: content program) to the download queue object 1704, which returns an ok object response 1712 to the client device application. The download queue object also communicates a content download queue changed return object 1714 to the client device application.

Figure 13:
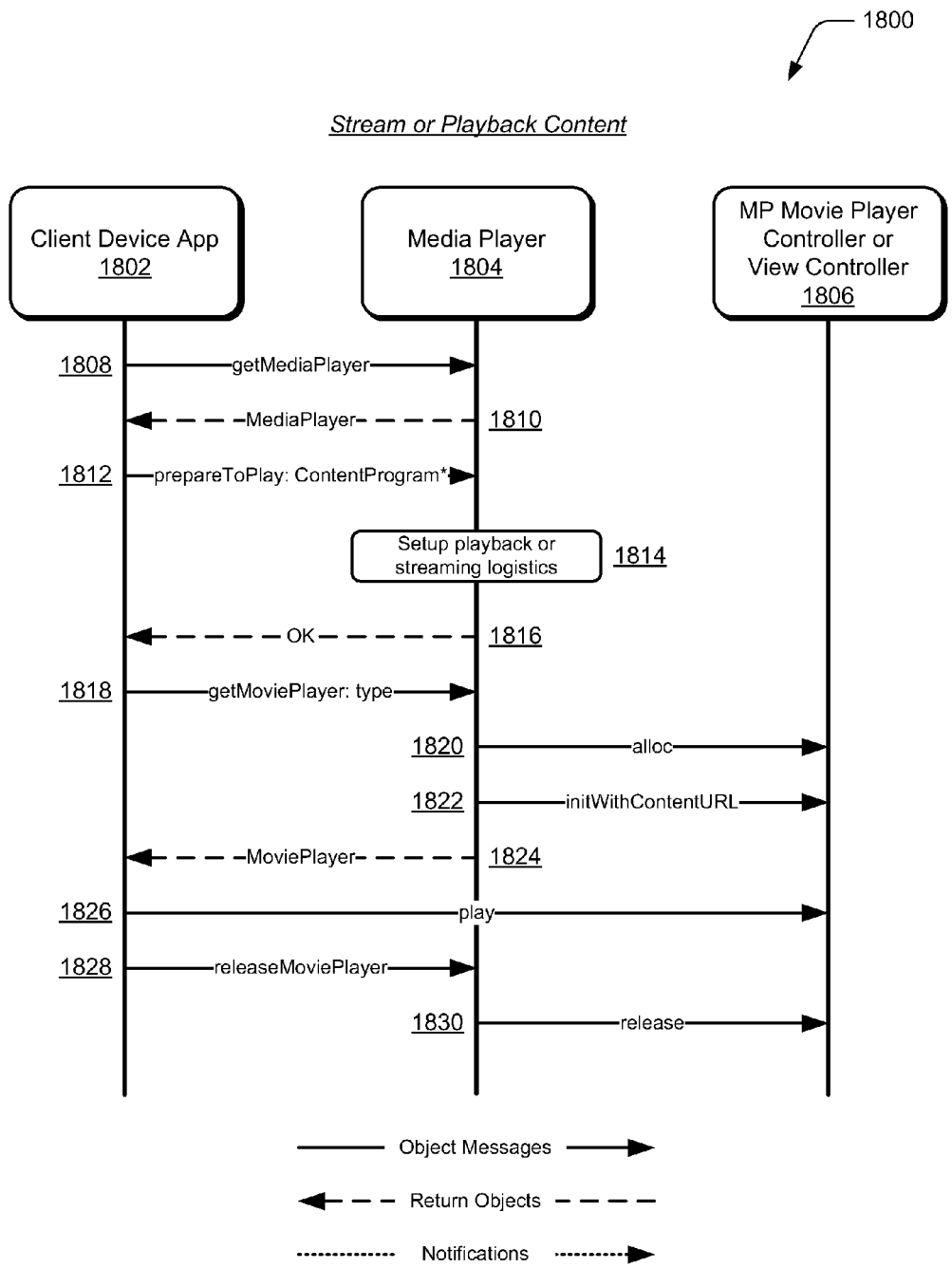

FIG. 13 illustrates an example of a Stream or Playback Content communication sequence 1800 between a client device application 1802, a media player object 1804, and an MP (MPEG) movie player controller or view controller 1806 (MP controller) to stream media content or playback media content on the client device. The client device application 1802 can be implemented on the client device 128 as described with reference to FIG. 1. Further, the media player object 1804 is an example of the media player class 310 in the client device API object model 300 described with reference to FIG. 2. The media player class represents the media player 142 that is instantiated by the proxy application 144, and includes functionality to control playback of recorded media content and/or streaming media content on the client device. The playback of the recorded media content, and playback of the streaming media content, are both different instantiations of the media player class.

In the example communication sequence 1800, the client device application 1802 initiates a get media player object message 1808 to the media player object 1804, which returns the media player return object 1810 to the client device application. The client device application then communicates a prepare to play content program object message 1812 to the media player object 1804. The media player can then setup playback or streaming logistics 1814 and communicate an ok return object 1816 to the client device application. The client device application then communicates a get movie player type object message 1818 to the media player object 1804, which in turn, communicates an allocation object message to the MP controller 1806. The media player object 1804 also communicates an init with content URL object message 1822 to the MP controller, and the media player object responds to the client device application with a movie player return object 1824. The client device application communicates a play object message 1826 to the MP controller 1806, as well as a release movie player object message 1828 to the media player 1804. The media player then communicates the release object message 1830 to the MP controller 1806.

Although embodiments of altering transcoding priority for media content have been described in language specific to features and/or methods, the subject of the appended claims is not necessarily limited to the specific features or methods described. Rather, the specific features and methods are disclosed as example implementations of altering transcoding priority for media content. One of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims.

We claim:

1. A method for altering transcoding priority, comprising:
sending, to a media server, a plurality of messages for altering a corresponding transcoding priority of a corresponding selected content program object that represents media content, and wherein at least some of the messages indicate a change to the corresponding transcoding priority by altering a position of a reference to the selected content program object in a transcoding queue of the media server;
receiving, from the media server for each of a first subset of the messages, a corresponding first return code that indicates that the transcoding priority of the corresponding selected content program object was successfully altered in response to the corresponding message from the first subset of the messages;
receiving, from the media server for each of a second subset of the messages, a corresponding second return code that indicates that the corresponding selected content program object was not found; and
receiving, from the media server for each of a third subset of the messages, a corresponding third return code that indicates that the transcoding priority of the corresponding selected content program object was not altered, wherein the first subset, the second subset, and the third subset are each mutually exclusive subsets of the messages.

2. The method as recited in claim 1, further comprising, prior to the step of sending the message:
sending, to the media server, a request for a content array that represents media content to be available from the media server; and
receiving the content array from the media server, the content array listing one or more content program objects that each represent media content to be available from the media server.

3. The method as recited in claim 2, wherein the content array represents only media content not previously transcoded by the media server.

4. The method as recited in claim 2, wherein at least some of the one or more content program objects represent media content not previously transcoded by the media server.

5. The method as recited in claim 1, wherein at least some of the messages for altering a transcoding priority comprise a message for increasing the transcoding priority by moving a reference to the selected content program object to a first position in a transcoding queue of the media server.

6. The method as recited in claim 1, further comprising receiving media content segments comprising transcoded media content associated with at least some of the corresponding selected content program objects.

7. The method as recited in claim 1, further comprising receiving, for a fourth subset of the messages, a fourth return code that indicates that the corresponding selected content program object was already transcoded.

8. A method for altering transcoding priority, comprising:
sending a plurality of content arrays from a media server to respective client devices, each of the content arrays listing one or more content program objects, wherein each of the one or more content program objects represents media content to be available to the respective client device from the media server;
receiving, by the media server and from the client devices, a plurality of messages for altering a transcoding priority of a corresponding selected content program object from the corresponding one or more content program objects, wherein the selected content program object represents media content, and at least some of the messages indicate a change to the corresponding transcoding priority by altering a position of a reference to the selected content program object in a transcoding queue of the media server;
altering, for each of a first subset of the messages, the corresponding transcoding priority of the corresponding selected content program object by moving a reference to the corresponding selected content program object in the transcoding queue of the media server and, in response, sending, by the media server, a corresponding first return code that indicates that the transcoding priority of the corresponding selected content program object was successfully altered in response to the respective message from the first subset of the messages;
determining, for each of a second subset of the messages, that a corresponding reference to the corresponding selected content program object in the transcoding queue of the media server cannot be found and, in response, sending, by the media server, a corresponding second return code that indicates that the corresponding selected content program object was not found; and
determining, for each of a third subset of the messages, that the corresponding transcoding priority of the corresponding selected content program object cannot be altered and, in response, sending, by the media server, a corresponding third return code that indicates that the transcoding priority of the corresponding selected content program object was not altered, wherein the first subset, the second subset, and the third subset are each mutually exclusive subsets of the messages.

9. The method as recited in claim 8, further comprising, prior to the step of sending the content array:
receiving, by the media server, a request from at least one of the client devices for a content array that represents media content to be available from the media server.

10. The method as recited in claim 9, wherein the content array represents only media content not previously transcoded by the media server.

11. The method as recited in claim 9, wherein at least some of the one or more content program objects represent media content not previously transcoded by the media server.

12. The method as recited in claim 8, wherein at least some of the messages for altering a transcoding priority comprise a message for altering the transcoding priority by altering a position of a reference to the corresponding selected content program object in the transcoding queue of the media server.

13. The method as recited in claim 8, further comprising sending, to at least one of the client devices, media content segments comprising transcoded media content associated with the corresponding selected content program object.

14. The method as recited in claim 8, further comprising determining, for a fourth subset of the messages, that the corresponding selected content program has already been transcoded and, in response, sending, by the media server, a fourth return code that indicates that the corresponding selected content program object was already transcoded.

15. A media server system comprising:
a processor and a memory communicatively coupled to the processor;
a transcoding queue comprising references to a plurality of content program objects, wherein the plurality of content program objects represent media content and the processor when processing a plurality of messages that each correspond to one of the plurality of content program objects, at least some of the messages indicating a change to the corresponding transcoding priority by altering a position of a reference to the selected content program object in a transcoding queue of the media server, performs operations of:
- altering, for each of a first subset of the plurality messages, a corresponding transcoding priority of the corresponding content program object by moving the reference to the corresponding content program object in the transcoding queue and, in response, sending a corresponding first return code that indicates that the transcoding priority of the corresponding content program object was successfully altered in response to the respective message;
- determining, for each of a second subset of the messages, that a corresponding reference to the corresponding content program object in the transcoding queue of the media server cannot be found and, in response, sending a corresponding second return code that indicates that the corresponding content program object was not found; and
- determining, for each of a third subset of the messages, that a corresponding transcoding priority of the corresponding content program object cannot be altered and, in response, sending a corresponding third return code that indicates that the transcoding priority of the corresponding content program object was not altered, wherein the first subset, the second subset, and the third subset are each mutually exclusive subsets of the messages; and
- a transcoder configured to transcode media content associated with the plurality of content program objects according to the transcoding priority associated with each of the plurality of content program objects of the transcoding queue.

16. The media server system of claim 15, wherein altering a transcoding priority comprises increasing the transcoding priority by moving a reference to the corresponding content program object to a first position in the transcoding queue.

17. The media server system of claim 15, wherein altering a transcoding priority comprises increasing the transcoding priority by causing the media server to move a reference to the corresponding content program object to a first position in the transcoding queue.

18. The media server system of claim 15, wherein the operations comprise determining, for a fourth subset of the messages, that the corresponding content program has already been transcoded and, in response, sending a fourth return code that indicates that the corresponding content program object was already transcoded.

* * * * *